H. F. McMAHON.
CAMERA.
APPLICATION FILED NOV. 6, 1918.
1,369,753.
Patented Feb. 22, 1921.
FIG. I.
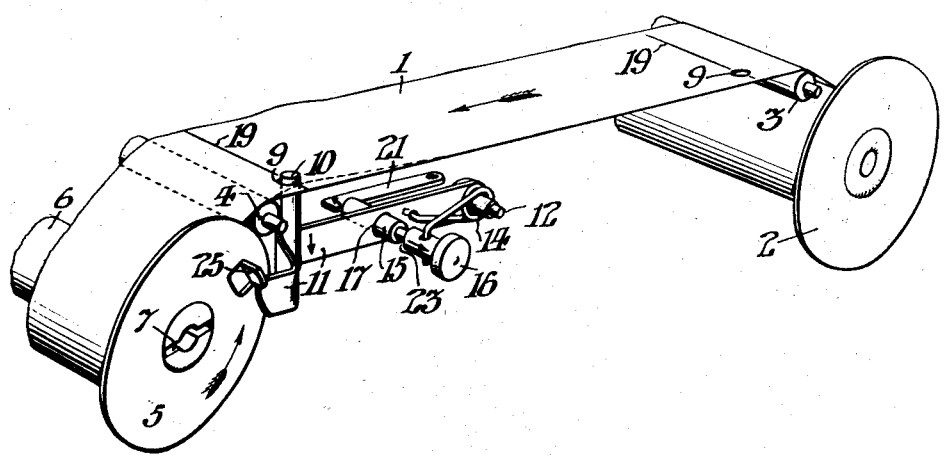
FIG. II.
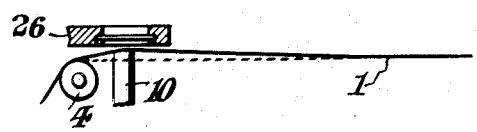
FIG. III.
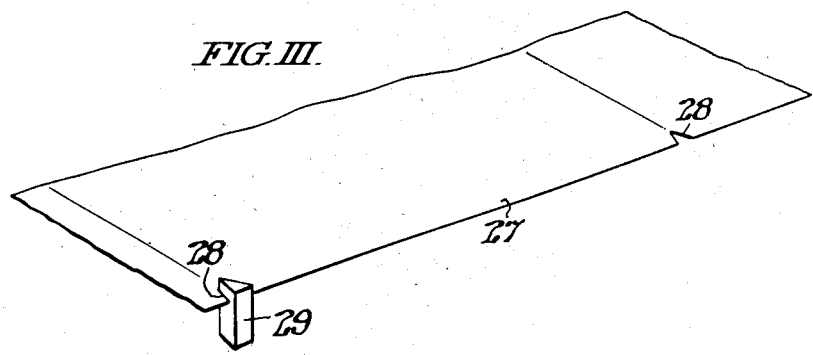
INVENTOR
HARRY F. MC MAHON,
by Arthur E. Paige,
ATTORNEY

UNITED STATES PATENT OFFICE.

HARRY F. McMAHON, OF TORONTO, ONTARIO, CANADA.

CAMERA.

1,369,753.  Specification of Letters Patent.  Patented Feb. 22, 1921.

Application filed November 6, 1918. Serial No. 261,407.

*To all whom it may concern:*

Be it known that I, HARRY F. MCMAHON, a citizen of the United States, residing at Toronto, in the Province of Ontario, in the Dominion of Canada, have invented a certain new and useful Improvement in Cameras, whereof the following is a specification, reference being had to the accompanying drawing.

The principal object of my invention is to provide a camera with means to prevent more than one exposure of the same portion of a sensitized medium therein, and it is exemplified herein by a camera of the type wherein a strip of sensitized film, for a series of pictures, is unwound from one spool onto another. Said camera includes mechanism for so interlocking the film and a button which is pushable to expose said film, that when said button has been pushed it is detained in inoperative position until the film strip is moved for another exposure, and when said strip has been thus moved, it is detained until again exposed. Such construction and arrangement is advantageous in that if the take-up spool resists turning movement, the operator may know that the portion of film presented for exposure has not been exposed, and if the push button resists movement, the operator may know that the portion of film presented has been exposed, and that it is necessary to turn the take-up spool. Said camera includes a spring actuated take-up spool, whereby the film may be automatically shifted to the extent of its portion exposed, as a consequence of the exposing movement of said push button or other element, by which such exposure is effected.

My invention includes the various novel features of construction and arrangement hereinafter more definitely specified.

In the drawing; Figure I is a fragmentary perspective view of parts of a camera embodying my improvement.

Fig. II is a fragmentary edge view of the film strip illustrated in Fig. I, showing the position thereof while passing to the locked position.

Fig. III is a fragmentary perspective view showing a film strip provided with a modified form of locking means.

Referring to the form of my invention shown in Figs. I and II: The film strip 1 is supplied upon the spool 2, and passes thence over the guide rollers 3 and 4 to the take-up spool 5, which may have the spring actuated drum 6, by which said film strip is automatically shifted in the direction of the arrow marked thereon in Fig. I, when released. However, said spool 5 is provided with the axial recess 7 for engagement with an ordinary winding handle, so that it may be manually turned, in the direction of the arrow marked thereon.

As shown in Fig. I; said film strip 1 is provided with means to lock it against lengthwise movement, including perforations 9 which are so spaced throughout its length that the portion of the film between successive perforations is sufficient for a single exposure. As shown in Fig. I; said film 1 is locked against lengthwise movement by the detent plunger 10 projecting through one of said perforations 9. Said detent plunger 10 is carried and operated by the locking lever 11, which is fulcrumed upon the stud 12 rigidly connected with the casing in which said spools and guide rollers are journaled. Said lever 11 is provided with the spring 14, conveniently a piece of wire encircling said stud 12 and having one end engaging said lever, and tending to swing it downwardly, as indicated by the arrow on said lever. However, said lever 11 is held stationary, in the locked position shown in Fig. I, by engagement with the stem 15 of the push button 16, which extends through a hole 17 in said lever. Said stem 15 is held in the locking position shown in Fig. I by the opposite end of said spring 14 which tends to shift said push button in the direction of the arrow marked on said stem.

Said push button 16 may be associated with any suitable mechanism for effecting the exposure of the portion of the film 1 presented, as above described, to wit, the portion between the lines 19, 19, which may coincide with said perforations 9. For instance, such mechanism may include an automatic shutter operable by the lever 21 when shifted in the direction of the arrow marked thereon in Fig. I. When said push button is thrust in the direction opposite to that of the arrow marked on its stem 15 in Fig. I, against the pressure of said spring 14, to effect the exposure, the reduced portion 23 of said stem is presented in said hole 17 so that said lever 11 is then swung downwardly by said spring 14 to withdraw the detent plunger 10 from the perforation 9 in said film strip 1, and thus permit the latter to be progressed in the direction of the arrow marked thereon in Fig. I. Such movement of said lever 11 causes it to engage said push button stem 15, at its reduced portion 23, and thus locks said push button 16 and prevents its return to the operative position shown in Fig. I; which return movement would, otherwise, be automatically effected by said spring 14: However, as the take-up spool 5 is turned to progress said film strip 1 in the direction of the arrow marked thereon in Fig. I, the eccentric lug 25, which projects therefrom in position to encounter the end of said lever 11, raises said lever, against the pressure of said spring 14, and, when said lever reaches its film locking position, shown in Fig. I, it releases said stem 15 so that the latter is automatically returned, by said spring 14, to the position shown in Fig. I. However, as such return of the lever 11 may be effected before the next succeeding perforation 9 in the film strip 1 is in position to receive said locking plunger 10, said strip is temporarily upheld by said plunger, from its normal plane shown in full lines in Fig. I and in dotted lines in Fig. II. Said film 1 is held in such unlocked position, indicated in dotted lines in Fig. I and in full lines in Fig. II, against the tension upon said strip incident to its movement by said spool 5; said spool 2 being provided, as usual, with a friction spring at its journal in the camera casing, which resists its turning movement to such a degree as to maintain the film strip 1 taut.

Although, as soon as the succeeding perforation 9 registers with said locking plunger 10, the tension of said film snaps it into locked position thereon, with a sound which is audible to the operator, I find it convenient to provide the camera casing 26 with a small window, conveniently covered with ruby colored pyrolin, in registry with said plunger 10, as indicated in Fig. II, so that the operator may see whether the film strip 1 is in locked position or not.

Therefore, it may be observed, that with the embodiment of my invention above described, the film locking lever 11 is immovably locked in engagement with the film, so as to prevent movement of the latter, when the push button 16 is in operative position, to effect an exposure of the portion of the film then presented. Moreover, after each exposure is effected, by movement of said push button 16, it is locked in inoperative position until released by movement of said locking lever 11, consequent upon movement of the film to remove the exposed portion thereof from the position in which it might be again exposed. Consequently, if said take-up spool 5 resists turning movement, the operator may know that the portion of the film strip 1 presented for exposure has not been exposed, and if said push button 16 resists movement, the operator may know that the portion of film presented has been exposed, and that it is necessary to turn the take-up spool.

It is to be understood that said spring drum 6 may be omitted from the take-up spool 5; so that the film strip 1 is only progressed when said spool is manually turned. Moreover, although I find it convenient to provide the film strip with locking means including the circular perforations 9, as above described, it is to be understood that other means may be employed, for instance, the film strip 27 shown in Fig. III has marginal notches 28, in such spaced relation as the perforations 9 aforesaid and adapted to be engaged by a locking detent 29.

Therefore, I do not desire to limit myself to the precise details of construction and arrangement herein set forth, as it is obvious that various modifications may be made therein, without departing from the essential features of my invention as defined in the appended claims.

I claim:

1. In a camera, the combination with two spools arranged to engage a film strip at its respectively opposite ends; of means arranged to turn said spools to progress a film from one to the other; means arranged to lock said film against such movement, including a reciprocatory detent movable to successively engage a series of openings in said film; a lever rigidly connected with said detent; a push button movable to effect exposure of said film; means connected with said push button, arranged to prevent movement of said detent until said push button is moved to expose said film, including a stem on said button arranged to reciprocate through an opening in said lever, and having a recessed portion adapted to register with said lever; means connecting said detent and push button arranged to prevent the return of said push button to its operative position, until the film is progressed to remove the exposed portion thereof from the region where its exposure might be again effected, including a single spring connecting said push button and lever, tending to hold said lever in the recess in said stem; means arranged to release said detent and permit said film to be progressed, including a projection, rigidly connected with one of said spools, arranged to shift said lever when said spool is turned; and spring actuated means, operatively connected with the spool having said projection, whereby said film may be automatically progressed when said detent is released.

2. In a camera, the combination with two spools arranged to engage a film strip at its respectively opposite ends; of means arranged to turn said spools to progress a film from one to the other; means arranged to lock said film against such movement, including a reciprocatory detent movable to successively engage a series of openings in said film; a lever connected with said detent; a push button movable to effect exposure of said film; means connected with said push button, arranged to prevent movement of said detent until said push button is moved to expose said film, including a stem on said button arranged to reciprocate through an opening in said lever, and having a recessed portion adapted to register with said lever; means connecting said detent and push button arranged to prevent the return of said push button to its operative position, until the film is progressed to remove the exposed portion thereof from the region where its exposure might be again effected, including a single spring connecting said push button and lever, tending to hold said lever in the recess in said stem; and means arranged to release said detent and permit said film to be progressed, including a projection rigidly connected with one of said spools, arranged to shift said lever when said spool is turned.

3. In a camera, the combination with two spools arranged to engage a film strip at its respectively opposite ends; of means arranged to turn said spools to progress a film from one to the other; means arranged to lock said film against such movement, including a detent movable to successively engage a series of openings in said film; a lever connected with said detent; a push button movable to effect exposure of said film; means connected with said push button, arranged to prevent movement of said detent until said push button is moved to expose said film, including a member arranged to reciprocate through an opening in said lever, and having a recessed portion adapted to register with said lever; means connecting said detent and push button arranged to prevent the return of said push button to its operative position, until the film is progressed to remove the exposed portion thereof from the region where its exposure might be again effected, including a spring tending to hold said lever in said recessed portion; and means arranged to release said detent and permit said film to be progressed, including a member connected with one of said spools, arranged to shift said lever when said spool is turned.

4. In a camera, the combination with two spools arranged to engage a film strip at its respectively opposite ends; of means arranged to turn said spools to progress a film from one to the other; means arranged to lock said film against such movement, including a detent movable to successively engage a series of openings in said film; a lever connected with said detent; a push button movable to effect exposure of said film; means connected with said push button, arranged to prevent movement of said detent until said push button is moved to expose said film, including a stem on said button having a recessed portion adapted to register with said lever; means connecting said detent and push button arranged to prevent the return of said push button to its operative position, until the film is progressed to remove the exposed portion thereof from the region where its exposure might be again effected, including a single spring connecting said push button and lever, tending to hold both said detent in engagement with said film and said lever in the recess in said stem; and means arranged to release said detent and permit said film to be progressed, including means arranged to shift said lever when one of said spools is turned.

5. In a camera, the combination with two spools arranged to engage a film strip at its respectively opposite ends; of means arranged to turn said spools to progress a film from one to the other; means arranged to lock said film against such movement, including a reciprocatory detent movable to successively engage a series of openings in said film; a lever connected with said detent; a push button movable to effect exposure of said film; means connected with said push button, arranged to prevent movement of said detent until said push button is moved to expose said film, including a stem on said button arranged to reciprocate through an opening in said lever, and having a recessed portion adapted to register with said lever; and means connecting said detent and push button arranged to prevent the return of said push button to its operative position, until the film is progressed to remove the exposed portion thereof from the region where its exposure might be again effected.

6. In a camera, the combination with two spools arranged to engage a film strip at its respectively opposite ends; of means arranged to turn said spools to progress a film from one to the other; means arranged to lock said film against such movement, including a reciprocatory detent movable to successively engage a series of openings in said film; a lever connected with said detent; a push button movable to effect exposure of said film; means connected with said push button, arranged to prevent movement of said detent until said push button is moved to expose said film, including a stem on said button having a recessed portion adapted to register with said lever; and means connecting said detent and push button arranged to prevent the return of said push button to its operative position, until the film is progressed to remove the exposed portion thereof from the region where its exposure might be again effected.

7. In a camera, means arranged to lock a film strip against movement, including a detent movable to successively engage a series of openings in said film; a lever connected with said detent; a push button movable to effect exposure of said film; means connected with said push button, arranged to prevent movement of said detent until said push button is moved to expose said film, including a stem on said button having a recessed portion adapted to register with said lever; and means connecting said detent and push button arranged to prevent the return of said push button to its operative position, until the film is progressed to remove the exposed portion thereof from the region where its exposure might be again effected.

8. In a camera, means arranged to lock a film strip against movement, including a detent movable to successively engage a series of openings in said film; a lever connected with said detent; a push button movable to effect exposure of said film; and means connected with said push button, arranged to prevent movement of said detent until said push button is moved to expose said film, including a stem on said button having a recessed portion adapted to register with said lever.

In testimony whereof I have hereunto signed my name at Toronto, Canada this 15th day of September, 1918.

HARRY F. McMAHON.

Witnesses:
L. W. BEATTY,
V. PARISH.